United States Patent
Tajima

(10) Patent No.: US 6,366,377 B1
(45) Date of Patent: Apr. 2, 2002

(54) OPTICAL NETWORK AND SWITCH CONTROL METHOD FOR USE IN THE OPTICAL NETWORK

(75) Inventor: Akio Tajima, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/066,607

(22) Filed: Apr. 27, 1998

(30) Foreign Application Priority Data

Apr. 28, 1997 (JP) .............................................. 9-111621

(51) Int. Cl.[7] ................................................ H04J 14/02
(52) U.S. Cl. ........................ 359/128; 359/117; 359/154
(58) Field of Search ................................ 359/117, 128, 359/139, 134, 154, 160

(56) References Cited

U.S. PATENT DOCUMENTS

| | | | | |
|---|---|---|---|---|
| 5,194,977 A | * | 3/1993 | Nishio ......................... | 359/128 |
| 5,463,486 A | * | 10/1995 | Stevens ....................... | 359/117 |
| 5,812,290 A | * | 9/1998 | Maeno et al. ................ | 359/117 |
| 5,959,750 A | * | 9/1999 | Eskildsen et al. ........... | 359/134 |

FOREIGN PATENT DOCUMENTS

JP          3-207139          9/1991

* cited by examiner

Primary Examiner—Kinfe-Michael Negash
(74) Attorney, Agent, or Firm—Young & Thompson

(57) ABSTRACT

In a method of controlling a switching operation of an optical network for use in connection between an optical transmitter and an optical receiver through an optical switch is controlled by a switch controller, the optical receiver is given through the optical switch a sequence of combined optical signals which is formed by combining a sequence of optical signals with an additional sequence of optical signals. The additional sequence of the optical signals may be either a sequence of optical signals sent to another optical receiver or a sequence of dummy optical signals. The combined optical signal sequence has a time interval which is defined between two adjacent ones of the combined optical signals and which is shorter than a predetermined time interval of, for example, 1 millisecond. Such a combined optical signal sequence serves to avoid occurrence of an optical surge appearing when the time interval is longer than the predetermined time interval.

3 Claims, 8 Drawing Sheets

OPTICAL NETWORK AND SWITCH CONTROL METHOD FOR USE IN THE OPTICAL NETWORK

BACKGROUND OF THE INVENTION

This invention relates to an optical network which connects each of optical transmitters to each optical receiver through an optical switch and, in particular, to a method of controlling the receivers and the optical switch.

Heretofore, it is known in the art that an optical spatial switch in an optical network is large in capacity and small in size as compared with an electrical switch. Such an optical spatial switch has been proposed together with an optical network in Japanese Unexamined Patent Publication No. Hei 3-207139, namely, 207139/1991.

Specifically, a switching operation is carried out by the optical switch to switch optical signals sent out from an optical transmitter which includes an E/O (electro-optic) converter. The switched signals are sent to an optical receiver through the optical switch. The optical receiver converts the switched signals into electric signals by an O/E (opto-electric) converter of the optical receiver and amplifies the electric signals into an amplified electric signal by an amplifier of the optical receiver.

In the optical network using the spatial optical switch, optical power which is given to the optical receiver is inevitably reduced due to an optical branch or an optical coupler. This results in a reduction of the scale of the optical switch, or of throughput per port of the optical switch. In order to improve the throughput, a WDM (Wavelength Division Multiplex) technique has been often used. However, the optical switch becomes large in size and is subjected to a restriction of the number of wavelengths used therein when the WDM technique is adopted.

On the other hand, it is a recent trend that an erbium-doped (Er-doped) fiber amplifier (EDFA) has been used in each optical receiver as an optical preamplifier to be optically coupled to the optical switch. In this event, however, it often happens that optical receiving elements, such as photo-diodes, are broken or operations become unstable in rear stage circuits connected after the EDFA.

Herein, it is to be noted that each of the optical receivers is not always continuously supplied with a sequence of input optical signals from an optical transmitter. In other words, the optical receiver is often intermittently given the input optical signals from the optical transmitter with a time interval kept between two adjacent ones of the input optical signals. It often happens that such a time interval between the two adjacent input optical signals lasts for more than several milliseconds. This shows that the optical receiver is put into an inactive or quiescent state during the time interval between the two adjacent input optical signals which may be called an anterior optical signal and a posterior optical signal hereinafter.

Under the circumstances, it has been found out that the above-mentioned breakage of the optical receiving elements, the rear stage circuits, and the like is often caused to occur when the optical receiver has the optical preamplifier formed by the EDFA and when an output optical signal which accompanies an optical surge when the posterior optical signal is supplied with the optical receiver a predetermined time interval, such as several milliseconds, after reception of the anterior optical signal. As a result, the output optical signal which corresponds to the posterior optical signal has a great amplitude at a leading part thereof, which brings about the breakage of the optical receiving elements and so.

SUMMARY OF THE INVENTION

It is therefore an object of this invention to provide an optical network which is capable of avoiding occurrence of an optical surge in an optical receiver and, as a result, preventing breakage of optical receiving elements connected to the optical receiver.

It is another object of this invention to provide a method which is capable of operating the optical receiver without occurrence of the optical surge.

It is still another object of this invention to provide a method which is capable of mitigating a restriction of a scale or a restriction of the throughput.

A method to which the present invention is applicable is for use in controlling an optical network comprising a specific optical receiver which is operable in a sequence of optical input signals with a time interval left between two adjacent ones of the optical input signals to produce a sequence of optical output signals. According to an aspect of the present invention, the method comprises the steps of sending an additional sequence of optical signals to said optical receiver in addition to the optical input signal sequence and combining the additional optical signal sequence and the optical input signal sequence into a sequence of combined optical signals so that each of the combined optical signals is interposed between the two adjacent optical input signals. The additional sequence of the optical signals may be either a sequence of optical input signals directed to the additional optical receiver different from the specific optical receiver or a sequence of dummy optical signals generated by a dummy signal generator.

The method further comprises the step of discriminating the optical input signal sequence from the combined optical signal sequence after the combined optical signal sequence is allowed to pass through the specific optical receiver.

According to another aspect of the present invention, a method is for use in controlling a switching operation of an optical network comprising a plurality of optical transmitters, a plurality of optical receivers each of which includes an optical preamplifier, an optical switch between the optical transmitters and the optical receivers by using optical signals, and a switch controller controlling of the optical switch. The method comprises the step of connecting each of the optical receivers to the plurality of the optical transmitters by carrying out the switching operation within a predetermined time interval under control of the switch controller.

According to still another aspect of the present invention, an optical network is for use in connection between an optical transmitter and an optical receiver. The optical network further comprises at least one of dummy optical signal generators that generates a sequence of dummy optical signals, an optical switch which connects the dummy optical signal generator to said optical receiver, and a switch controller which controls the optical switch to connect the optical receiver to both the optical transmitter and the dummy optical signal generators.

DESCRIPTION OF THE PREFERRED EMBODIMENT

Figure 1:
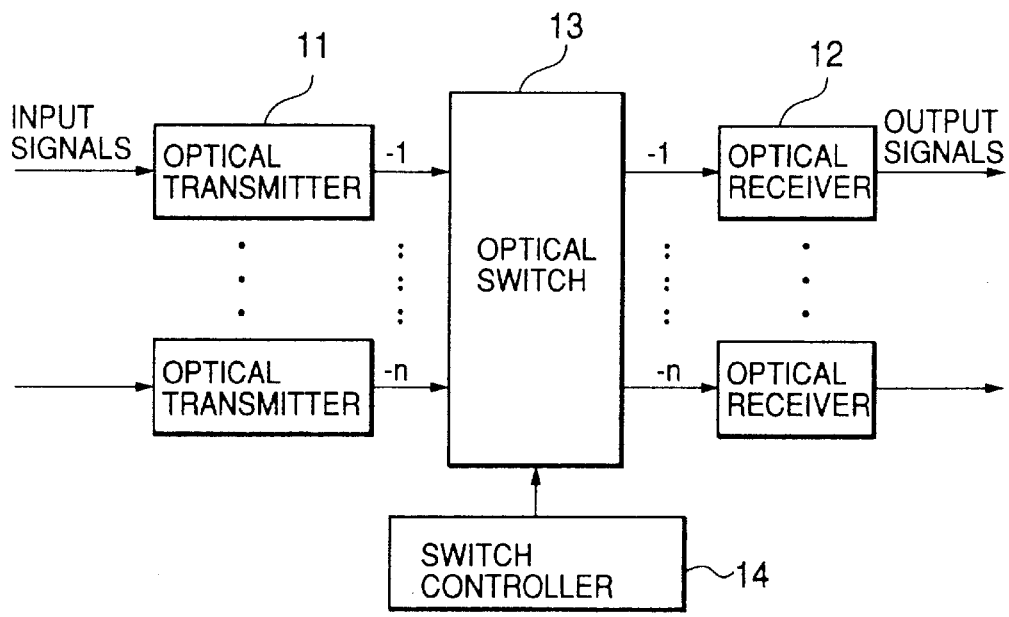
FIG. 1 is a block diagram of a conventional optical network.

Referring to FIG. 1, description will be at first made about a conventional optical network which comprises an optical switch 13, a plurality of optical transmitters 11, n in number, a plurality of optical receivers 12, n in number, and a switch controller 14. Herein, it is noted that a pair of an optical transmitter and an optical receiver is operable as a node and that the illustrated optical switch 13 may be therefore considered as being coupled to n sets of nodes, although each node is specified in FIG. 1 only by either one of the optical receivers and the optical transmitters.

With this structure illustrated in FIG. 1, cross connections are made among the optical transmitters 11 and the optical receivers 12. In this case, a sequence of optical transmission signals or pulses is usually delivered from one of the optical transmitters 11 to selected one or ones of the optical receivers 12 as a sequence of optical input signals or pulses through the optical switch 13 under control of the switch controller 14. Let each optical receiver 12 include an EDFA in this example.

From this fact, it is readily understood that each optical receiver 12 is supplied with the optical input signal sequence with a time interval kept between two adjacent ones of the optical input signals. The time interval becomes long when the optical input signal sequence sent to each optical receiver 12 is interrupted until reception of a next following optical input signal sequence. As a result, it often happens that the time interval lasts for several milliseconds.

According to the inventor's experimental studies, it has been found out that each optical receiver produces a sequence of optical output signals with an optical surge when the time interval lasts for a predetermined time interval of, for example, several milliseconds or more and when the EDFA is used in each optical receiver.

Figure 2:
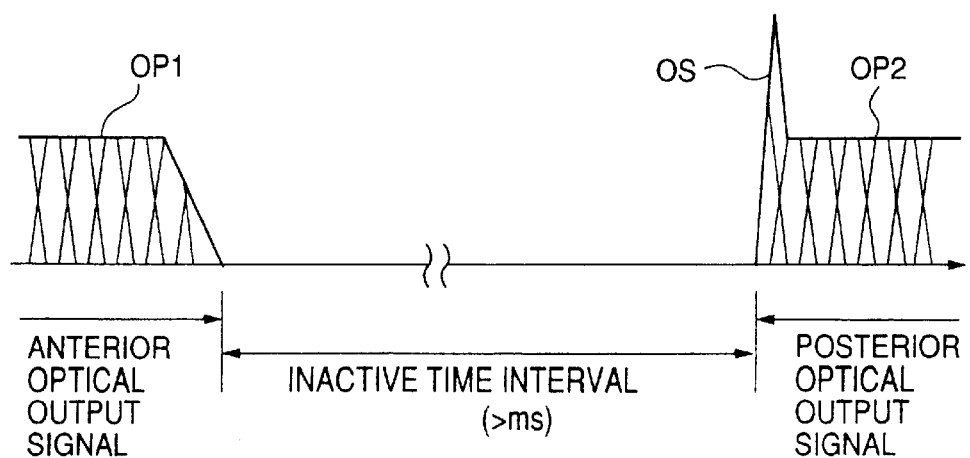
FIG. 2 is a time-chart for use in describing an optical surge which appears at an optical receiver illustrated in FIG. 1.

Referring to FIG. 2, illustration is made about optical output signals or pulses which are produced from the EDFA or each optical receiver 12 shown in FIG. 1 and which are specified by an anterior optical output signal OP1 and a posterior optical output signal OP2. Without loss of generality, it is assumed that the anterior and the posterior optical output signals OP1 and OP2 may be sent from an i-th one of the nodes and a j-th one of the nodes, respectively, where i and j may be equal to each other or different from each other. As shown in FIG. 2, a long time interval of, for example, several milliseconds is left between the anterior and the posterior optical output signals OP1 and OP2 and may be called a quiescent or an inactive time interval. In this event, an optical surge OS inevitably appears at a leading portion of the posterior optical output signal OP2. However, such an optical surge is not observed when the time interval or the quiescent time interval is shorter than 1 millisecond or so. For example, no optical surge appears when the time interval is as short as 50 nanoseconds or so. It has been inferred that such an optical surge could be due to the EDFA of each optical receiver 12.

Figure 3:
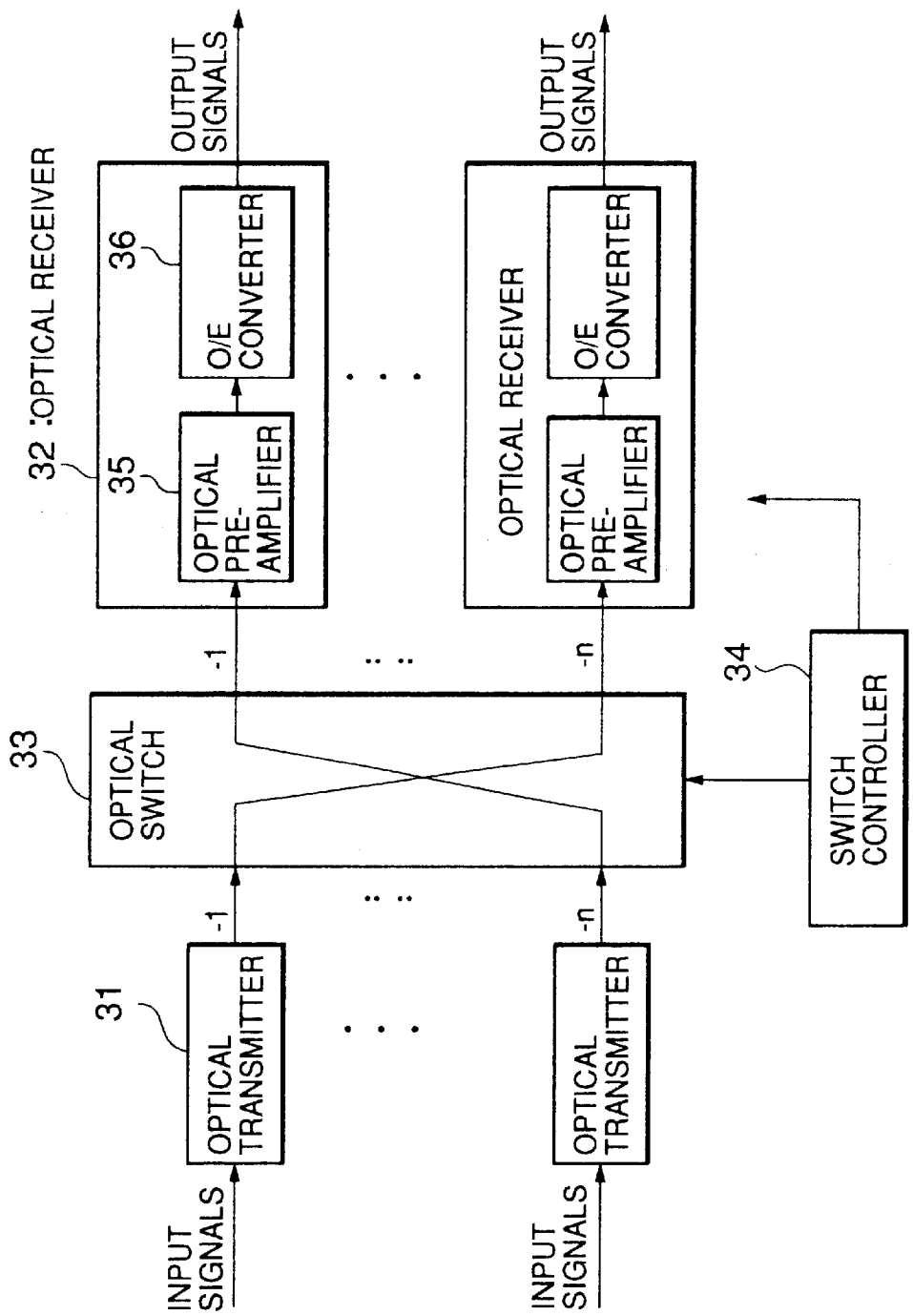
FIG. 3 is a block diagram of an optical network according to a first embodiment of this invention.

Referring to FIG. 3, an optical network according to a first embodiment of this invention comprises a plurality of optical transmitters 31, a plurality of optical receivers 32, an optical switch 33, and a switch controller 34, like in FIG. 1. The optical transmitters 31 and the optical receivers 32 are connected to the optical switch 33 which is controlled by the switch controller 34.

Each of the optical transmitters 31 includes an E/O (electro-optic) converter formed by a photo element which has a characteristic suitable for the optical network. In consequence, a sequence of optical transmission signals is sent to the optical switch 33 to be delivered to selected one or ones of the optical receivers 32. On the other hand, each of the optical receivers 32 comprises an optical preamplifier 35 and an O/E (opto-electric) converter 36. The optical output signals OP1 and OP2 as illustrated in FIG. 2 are produced as output signals of each optical preamplifier 35.

In each of the optical receivers 32, the optical preamplifier 35 amplifies the optical input signals received through the optical switch 33 into the optical output signals (namely, amplified optical signals). Thereafter, the O/E converter 36 converts the amplified optical signals into electric signals which are transferred as a sequence of output data signals to an external device.

The switch controller 34 controls the optical switch 33 in accordance with a switch control operation determined for the optical network of this invention. As a result, the optical switch 33 is operated under control of the switch controller 34 and switches the optical transmission signals from the optical transmitters 31 to deliver switched optical signals to destined optical receivers 32.

To this end, the optical switch 33 and the switch controller 34 cooperate with each other to carry out the switch control operation to be described.

Figure 4:
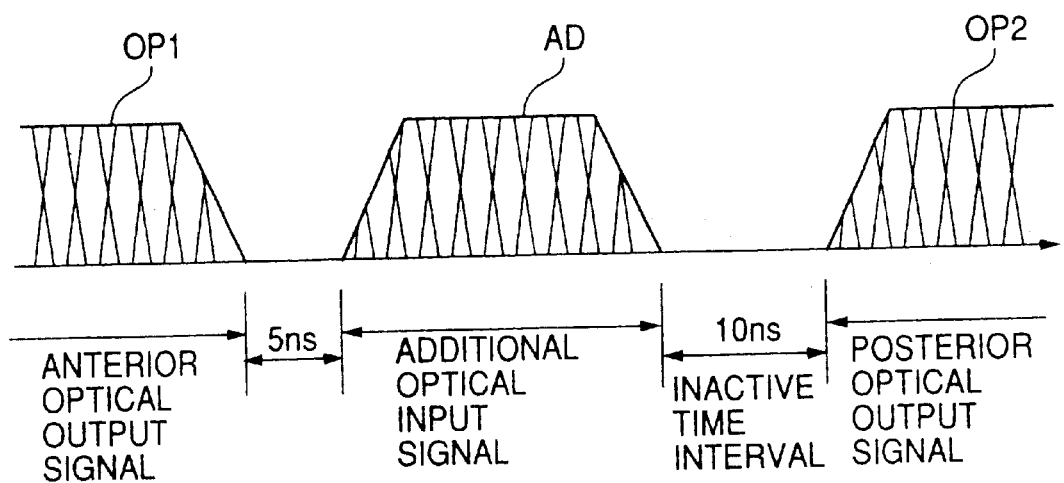
FIG. 4 is a time-chart for use in describing an output optical signal of an optical receiver used in the optical network according to each embodiment of this invention.

Referring to FIG. 4, the switch control operation is executed by the switch controller 34 so that each of the optical input signals is successively given to each optical receiver 32 at a time interval which is shorter than the predetermined time interval of, for example, 1 millisecond. In other words, the time interval between two adjacent ones of the optical input signals is controlled by the switch controller 34 so that no optical surge takes place at the posterior optical input signal even when the EDFA is used in each optical receiver 32. In FIG. 4, an additional optical input signal AD is interposed between the anterior and the posterior optical input signals OP1 and OP2. As shown in FIG. 4, the additional optical input signal AD appears 5 nanoseconds after the anterior optical input signal OP1 and disappears 10 nanoseconds before the posterior optical input signals OP2. Such a combination of the optical input signals OP1 and OP2 with the additional optical input signal AD enables prevention of the optical surge in each optical receiver 32. In addition, the additional optical input signal AD can be removed from the optical input signals OP1 and OP2 by the use of a conventional technique.

Figure 5:
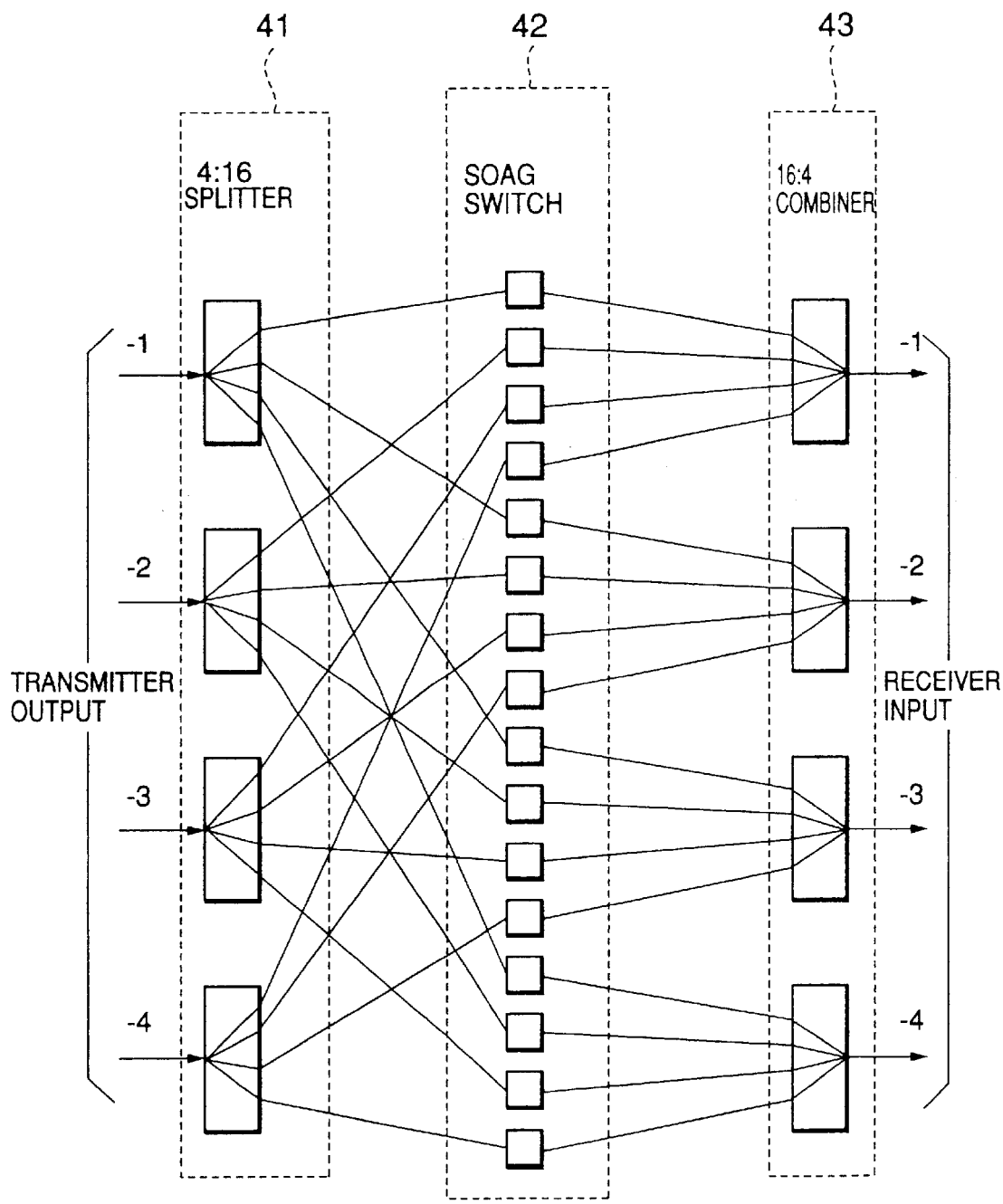
FIG. 5 is a block diagram of an optical switch used in the optical network illustrated in FIG. 3.

Referring to FIG. 5 afresh and FIG. 3 again, the optical switch 33 has a configuration of four by four and may be therefore referred to as a four by four optical switch. As shown in FIG. 5, the optical switch 33 has four optical input ports numbered from 1 to 4, four output ports numbered from 1 to 4, a 4 to 16 splitter 41, an SOAG (semiconductor optical amplifier gate) 42, and a 16 to 4 combiner 43. The 4 to 16 splitter 41 has four 1 to 4 splitter units while the SOAG 42 has sixteen switch units. In addition, the 16 to 4 combiner 43 has four 4 to 1 combiner units.

As readily understood from FIG. 5, each combiner unit in the combiner 43 is connected to all of the splitter units in the splitter 41 through four of the switch units of the SOAG 42.

With this structure, let first through fourth transmission optical signals be successively given to the four splitter units in the splitter 41, respectively. In this event, the first through the fourth transmission optical signals are delivered to each of the combiner units in the illustrated optical switch 33 as switched optical signals. In other words, four of the switched optical signals are given to each of the combiner units and are sent to each optical receiver 32 (shown in FIG. 3) in the form of a sequence of receiver optical input signals. Accordingly, each time interval becomes very short among two adjacent ones of the receiver optical input signal sequence. This is because the four switched optical signals are arranged in the receiver input signal sequence. Specifically, each time interval is selected so that it becomes shorter than 1 millisecond and an optical surge is not caused to occur in the optical output signal sequence sent from each optical receiver 32. Thus, the illustrated optical switch serves to provide a plurality of connections between the input and the output ports and to carry out broadcast or multicast.

In the example, each optical transmitter has a DFB-EA (distributed feedback laser diode-electric field absorption modulator) which produces the transmission optical signal sequence at a rate of 10 Gbps. The average optical power of the transmission optical signal sequence has average optical power of −5 dBm. On the other hand, each optical receiver 32 exhibits a reception sensitivity of −30 dBm at the rate of 10 Gbps. In each optical receiver 32, the optical preamplifier 35 is excited by a wavelength of 1.48 μm and has a gain of 15 dB and saturation optical power of 10 dBm. The O/E converter 36 is formed by a pin type photo diode and a silicon preamplifier operable in a bandwidth of 8 GHz. Moreover, an optical loss of the splitter 41 and the combiner 43 is equal to 13 dB while the SOAG has a gain of 5 dB. As a result, a total optical loss in the optical switch 33 is equal to 8 dB.

Turning back to FIG. 3, each of the optical receivers 32 is supplied with the above-mentioned receiver optical input signal sequence which has a short time interval less than 1 millisecond. To this end, the switch controller 34 controls the optical switch 33 to shorten each time interval to less than 10 nanoseconds. Therefore, each optical receiver 32 is operated without occurrence of any optical surge and can therefore realize stable operation even when the EDFA is used as the optical preamplifier.

In this event, it is to be noted that each optical receiver 32 is given the receiver optical input signal sequence which includes a destined sequence to each output port and a superfluous sequence which is not destined to each output port, as readily understood from the above. Therefore, the receiver optical input signal sequence should be divided into the destined sequence and the superfluous sequence when the output signal sequence is sent from each optical receiver 32 to the external device. For this purpose, the switch controller 34 monitors the optical switch 33 and all the optical receivers 32 to make each optical receiver 32 select only the destined sequence. Such an operation can be accomplished by supplying a validity signal or an invalidity signal from the switch controller 34 to each optical receiver 32 and can be realized by a conventional technique.

Figure 6:
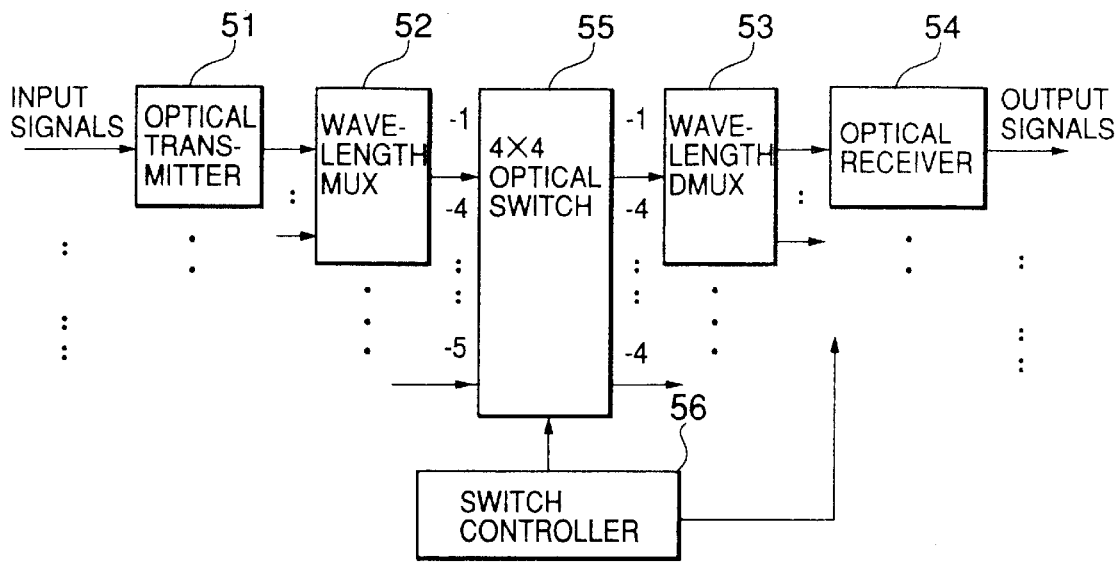
FIG. 6 is a block diagram of an optical network according to a second embodiment of this invention.

Subsequently, description will be made about a second embodiment of the present invention with reference to FIG. 6. The optical network in FIG. 6 is assumed to have four nodes each of which comprises four optical transmitters 51, a wavelength MUX (multiplexer) 52, a wavelength DMUX (demultiplexer) 53, and four optical receivers 54. The wavelength MUX 52 and the wavelength DMUX 53 are connected to an optical switch 55 which is controlled by a switch controller 56 in a manner mentioned in conjunction with FIG. 3 and which is therefore similar in structure to that illustrated in FIG. 5.

Four optical transmitters 51 transmit optical signals of 10 Gbps which have four different wavelengths of 1.545, 1.547, 1.549, and 1.551 micron-meters, respectively. Such optical signals are generated by the use of the DFB-EA light sources and are sent to the wavelength MUX 52. The average optical output power for each transmitter is equal to −5 dBm.

The wavelength MUX 52 mixes the optical signals of the four wavelengths together by the use of a 4:1 combiner which has a loss of 6 dB to produce a mixed optical signal. The mixed optical signal is sent to the optical switch 55 as a wavelength multiplexed signal.

The wavelength DMUX 53 receives the wavelength multiplexed signal sent through optical switch 55 and separates the wavelength multiplexed signal into four wavelength signals by an optical wave guide of a diffraction grating array type to be supplied to four optical receivers 54, respectively. Practically, the optical wave guide has a loss of 5 dB.

The optical receiver 54 is similar in structure to the optical receiver 32 illustrated in FIG. 3 and has therefore an optical preamplifier and an O/E converter.

In the illustrated example, a total optical loss for each wavelength is measured from the wavelength MUX 52 to the wavelength DMUX 53 through the optical switch 55 and is equal to 19 dB. In this case, the input power to the optical receiver 54 becomes equal to −24 dBm. Since a reception sensitivity of the optical receiver 54 reaches −30 dBm in the above-mentioned example, no problem takes place and effective amplification can be carried out.

The switch controller 56 controls the optical switch 55 and has the same function as the switch controller 34 mentioned in the first embodiment. Specifically, the switch controller 56 monitors the optical switch 55 and the optical receivers 54 so that the destined optical signal sequence alone is delivered to the destined output port in a usual manner. Accordingly, it is possible to obtain such a large capacity switch that the throughput per port reaches 40 Gbps in stable operation.

Subsequently, description will be made about a third embodiment of the present invention with reference to FIG. 7.

Figure 7:
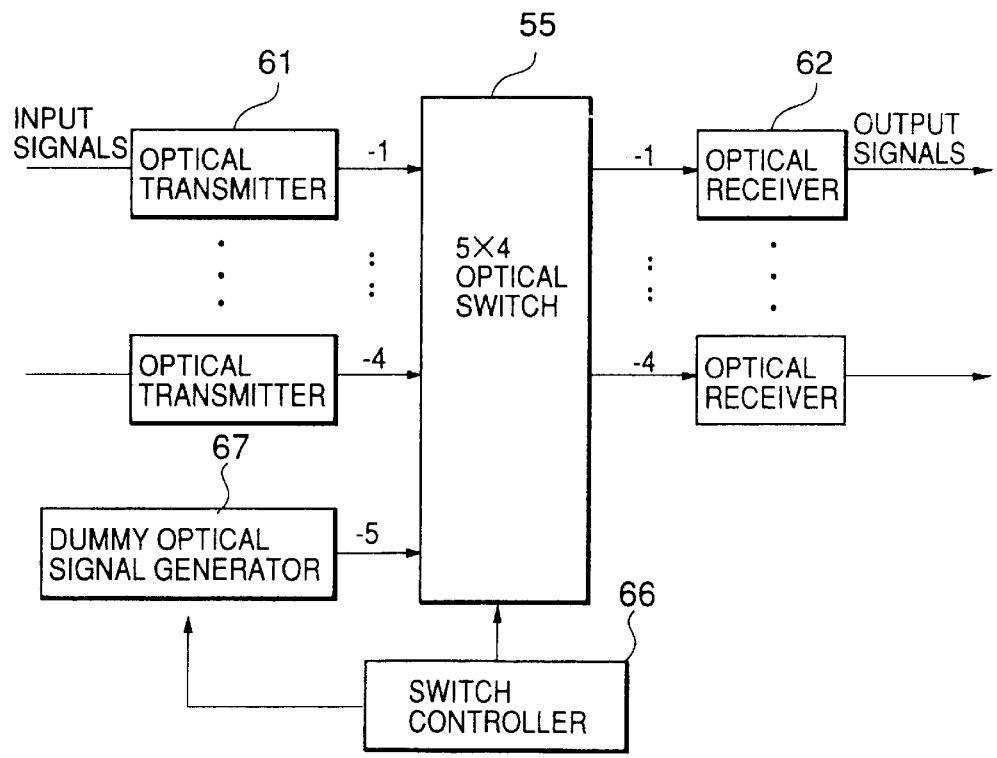
FIG. 7 is a block diagram of an optical network according to a third embodiment of this invention.

In the optical network illustrated in FIG. 7, a dummy optical signal generator 67 is added to the network system illustrated in FIG. 3 and always or continuously generates a sequence of dummy optical signals. In this connection, the dummy optical signal generator 67 may be referred to as a full-time operation transmitter. Accordingly, an optical transmitter 61 and an optical receiver 62 have the same function as the optical transmitter 31 and the optical receiver 32 illustrated in FIG. 3, respectively, and are connected to an optical switch 65. The dummy optical signal generator 67 is connected to the input side of the optical switch 65 in addition to the optical transmitters 61. The optical switch 65 has a configuration of five by four and is controlled by a switch controller 66.

Practically, the dummy optical signal generator 67 is formed by a light source of DFB-EA which generates an optical signal of a predetermined pattern with a wavelength of 1.55 micron-meters. In this example, the switch controller 66 controls the optical switch 65 and connects the dummy optical signal generator 67 to each of the optical receivers 62 when each optical receiver 62 is connected to none of the optical transmitters 61. In consequence, the predetermined pattern is sent from the dummy optical signal generator 67 to each optical receiver 62 when none of the optical transmitters 61 are connected to each optical receiver 61. Thus, the optical signal quiescent state in the optical receiver 62 does not appear which lasts for more than several milliseconds. The dummy optical signal generator 67 is helpful to prevent the above-mentioned problems by sending the predetermined pattern which is different from a continuous zero code. The predetermined pattern can be readily discriminated from the transmission optical input signals sent from the other optical transmitters 61 to each optical receiver 62.

Such a structure can realize the network system which avoids occurrence of any optical surge, which enables production of stable optical signals and stable switching.

Subsequently, description will be made about a fourth embodiment of the present invention with reference to FIG. 8.

In the optical network illustrated in FIG. 8, four dummy optical signal generators 77 and a wavelength MUX 78 are added to the second embodiment described with reference to FIG. 6. Accordingly, each of four nodes comprises four optical transmitters 71, a wavelength MUX 72, a wavelength DMUX 73, and four optical receivers 74, each of which has the same function as the optical transmitters 51, the wavelength MUX 52, the wavelength DMUX 53, and the optical receivers 54 illustrated in FIG. 6. At any rate, the wavelength MUXs 72 and the wavelength DMUXs 73 are connected to input and output sides of an optical switch 75, respectively. In addition, the wavelength MUX 78 is connected to the input side of the optical switch 75 together with the wavelength MUXs 72 and the wavelength MUX 78.

The optical switch 75 has a configuration of five by four and is controlled by a switch controller 76 in a manner similar to that described in conjunction with the third embodiment.

For example, the four dummy optical signal generators 77 generate, at a rate of 10 Gbps, dummy optical signals which have wavelengths of 1.545, 1.547, 1.549, and 1.551 micron-meters, respectively. The dummy optical signals are formed by DFB-EA light sources, respectively and sent to the wavelength MUX 78 in a manner similar to the wavelength MUXs 72.

The switch controller 76 controls the optical switch 75 and connects the dummy optical signal generators 77 to the optical receivers 74 so that the optical signal quiescent state does not last for more than several milliseconds in the optical receivers 74 like in FIG. 7. In any event, each dummy optical signal is sent to each optical receiver 74 that is connected to none of the optical transmitters 71. Each dummy optical signal generator 77 generates the predetermined pattern which is different from a sequence of zeros and serves to prevent occurrence of any problems. Such a predetermined pattern can be discriminated from the transmission optical signals sent from the other optical transmitters 71 to each optical receiver 74, as mentioned before.

Now, description will be made about a fifth embodiment according to the present invention with reference to FIG. 9.

Figure 9:
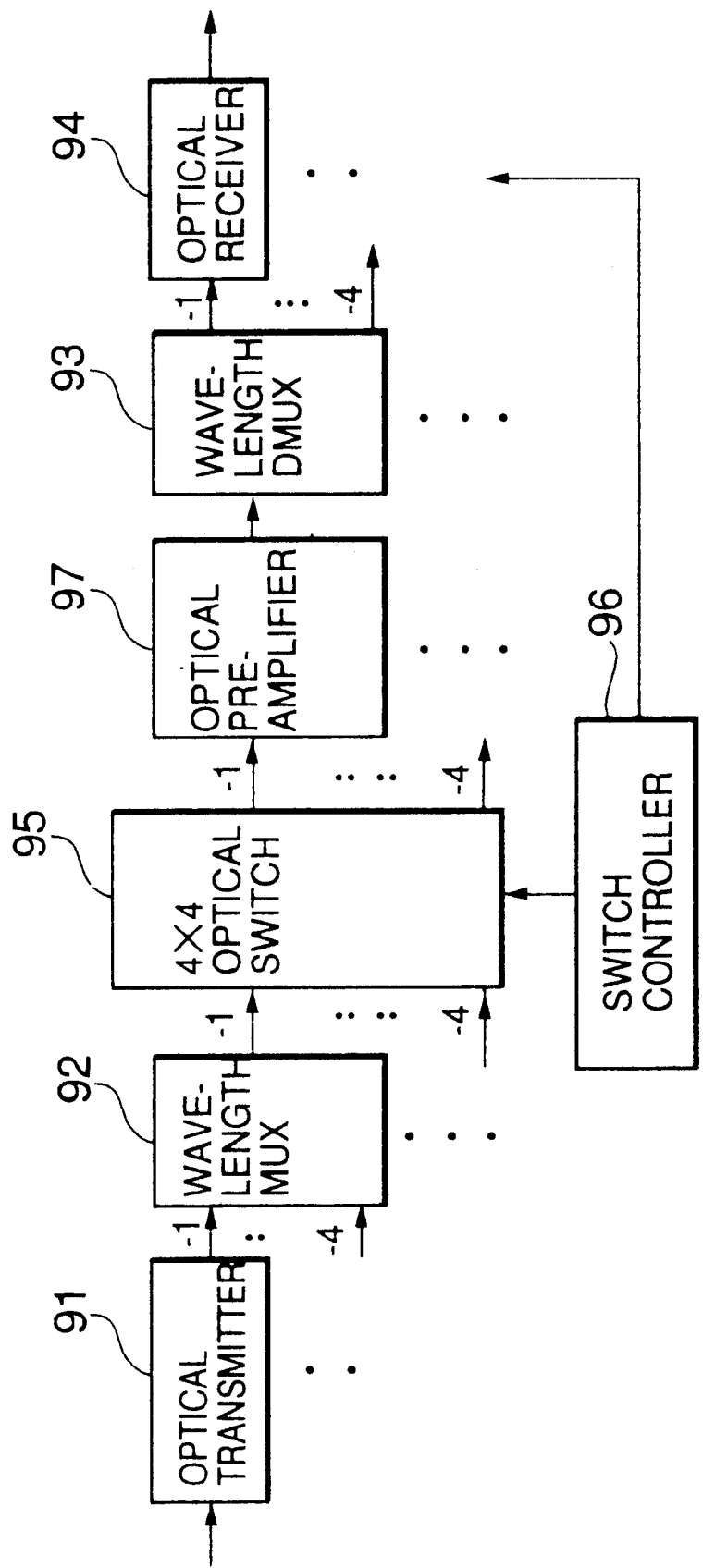
FIG. 9 is a block diagram of an optical network according to a fifth embodiment of this invention.

In the optical network of the fifth embodiment illustrated in FIG. 9, an optical preamplifier 97 is located outside of each optical receiver 94 and is arranged between an optical switch 95 and a wavelength DMUX 93. The illustrated optical preamplifier 97 amplifies a wavelength multiplexed signal sent from the optical switch 95 one at a time.

This means that each optical receiver 94 illustrated in FIG. 9 is different from FIG. 6 in that each optical receiver 94 has only an O/E converter without any optical preamplifier.

With this structure, the optical signals sent from the optical transmitter 91 are multiplexed by the wavelength MUX 92 and input into the optical switch 95 of four by four. The multiplexed optical signals output from the optical switch 95 are given through the optical preamplifier 97 to the wavelength DMUX 93 to be demultiplexed into four optical receivers 94.

Figure 10:
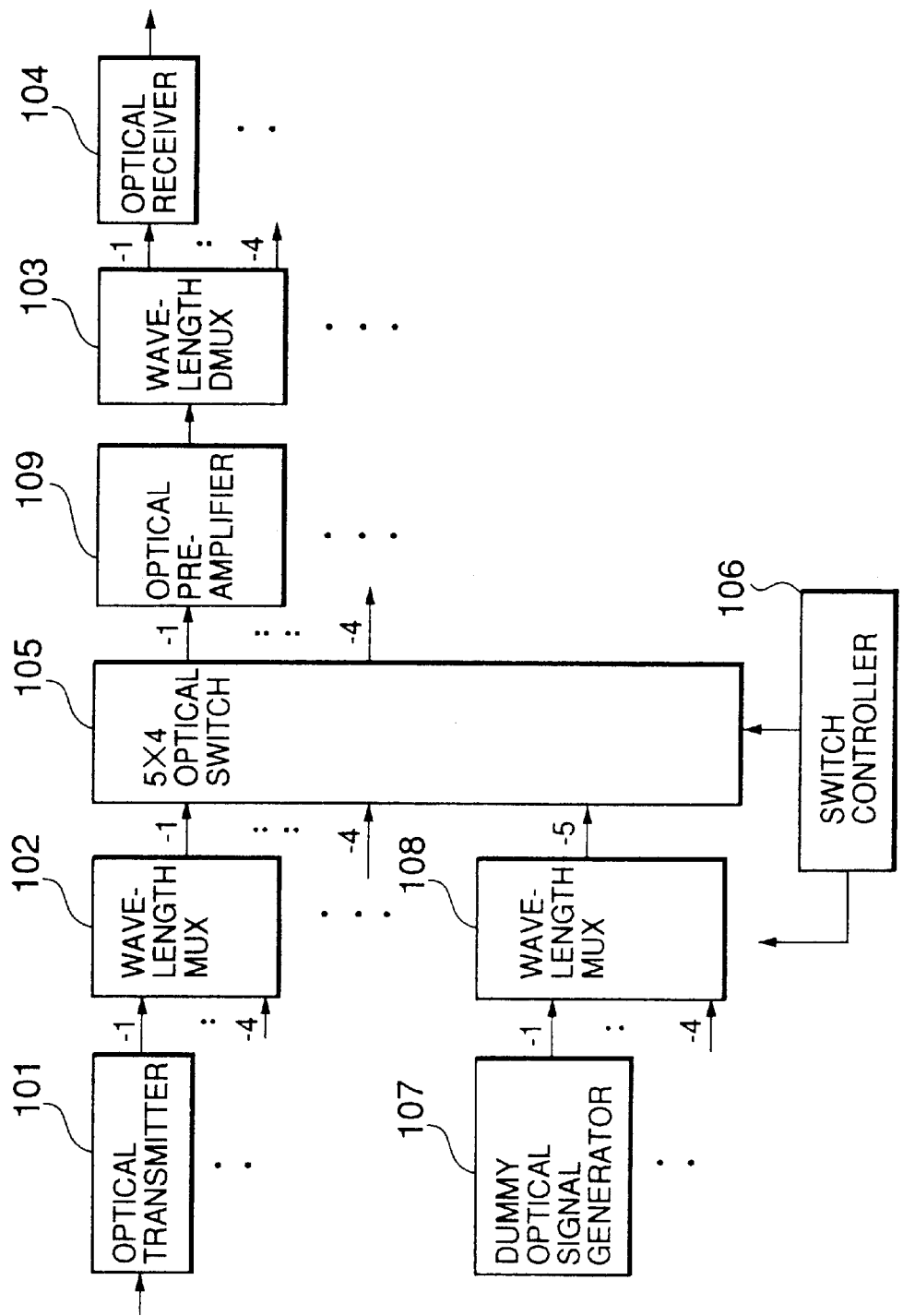
FIG. 10 is a block diagram of an optical network according to a sixth embodiment of this invention.

Referring to FIG. 10, a network system according to the sixth embodiment of the present invention is specified by an optical preamplifier 109 which is located outside of each optical receiver 104 and which is arranged between an optical switch 105 and a wavelength DMUX 103, like in FIG. 9. The illustrated preamplifier 109 amplifies a wavelength multiplexed signal sent from the optical switch 105 one at a time.

Figure 8:
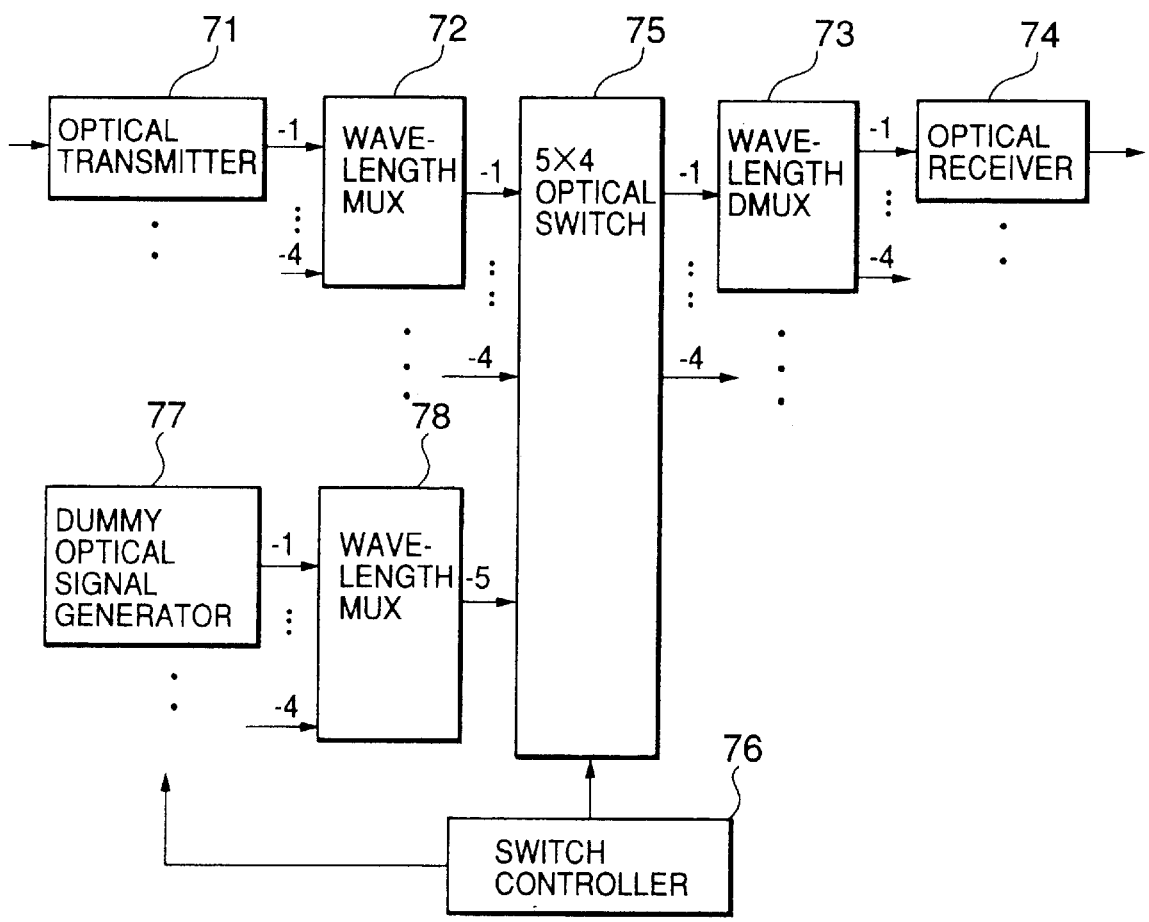
FIG. 8 is a block diagram of an optical network according to a fourth embodiment of this invention.

Namely, the network system illustrated in FIG. 10 is different from that shown in FIG. 8 in that each optical receiver 104 has only an O/E converter without any optical preamplifier.

With this structure, the transmission optical signals sent from the optical transmitter 101 are multiplexed by the wavelength MUX 102 and input into the optical switch 105. The optical signals output from the optical switch 105 are given through the optical preamplifier 109 to the wavelength DMUX 103 to be demultiplexed to four optical receivers 104.

The above fifth or sixth embodiment can reduce the number of the optical preamplifiers in comparison with the second or the fourth embodiment and is effective to avoid occurrence of any optical surge. This shows that stable operation can be accomplished in the network system.

In the above description, the semiconductor laser is assumed to have the wavelength of 1.55 micron-meter, but the laser may have other wavelengths. Although, the semiconductor laser described above is implemented by the DFB laser, any other laser devices, for example, DBR (distributed Bragg reflector) laser or the like may be used.

For the optical switch, the SOAG switch is not always included in the optical switch and an EA gate switch, a switch of $LiNbO_3$ may be employed instead of the SOAG. The optical switch may not be restricted to the configuration of four by four or five by four. Similarly, the number of the wavelengths multiplexed may also be changed to any other number and the wavelength DMUX may be formed by any other device different from the wave guide of the diffraction grating array type.

As far as the above features are satisfied, the present invention is not restricted to the above description. As described above, the present invention is advantageous in that the problems are solved about the scale restriction or the throughput restriction and avoidance of the optical surge generated in the optical preamplifier.

This is because the switch controller controls the optical switch and connects each of all optical receivers to the optical transmitter without any virtual interruption. This means that switching operation is performed within a very short time interval. Accordingly, the optical preamplifier may be used in the optical receiver for purpose of dissolution about the scale restriction or the throughput restriction.

What is claimed is:

1. A method of controlling a switching operation of an optical network comprising:

a plurality of optical transmitters;

a plurality of optical receivers, each said receiver having an optical preamplifier;

an optical switch being between said optical transmitters and said optical receivers; and a switch controller controlling the optical switch, said method comprising the steps of:

transmitting an input signal to each of said optical receivers at a time interval shorter than a predetermined time interval, said time interval being controlled by said switch controller;

choosing said time interval whereby no optical surge takes place at a posterior optical input signal.

2. A method of controlling a switching operation of an optical network comprising:

a plurality of optical transmitters;

a plurality of optical receivers, each said receiver having an EDFA (erbium doped fiber amplifier) as an optical preamplifier;

an optical switch being between said optical transmitters and said optical receivers; and a switch controller controlling the optical switch, said method comprising the steps of:

transmitting an input signal to each of said optical receivers at a time interval shorter than a predetermined time interval, said time interval being controlled by said switch controller;

choosing said time interval whereby no optical surge takes place at a posterior optical input signal.

3. The method of claim 1, wherein the step of transmitting further comprises a time interval shorter than one millisecond.

* * * * *